US012704647B2

(12) United States Patent
Cocker et al.

(10) Patent No.: US 12,704,647 B2
(45) Date of Patent: Aug. 11, 2026

(54) SATELLITE RADIO NAVIGATION OPERATIONS MONITORING SYSTEM AND METHOD

(71) Applicant: Palo Alto Research Center Incorporated, Palo Alto, CA (US)

(72) Inventors: Eric David Cocker, Redwood City, CA (US); Jule Ann Bert, East Palo Alto, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 851 days.

(21) Appl. No.: 17/823,612

(22) Filed: Aug. 31, 2022

(65) Prior Publication Data

US 2024/0069216 A1 Feb. 29, 2024

(51) Int. Cl.
*G01S 19/45* (2010.01)
*G01S 19/07* (2010.01)

(52) U.S. Cl.
CPC .............. *G01S 19/45* (2013.01); *G01S 19/07* (2013.01)

(58) Field of Classification Search
CPC .......... G01S 19/07; G01S 19/14; G01S 19/21; G01S 19/215; G01S 19/396; G01S 19/45; G01S 5/0009
See application file for complete search history.

(56) References Cited

U.S. PATENT DOCUMENTS 10,429,487 B1 * 10/2019 Fowe .................... G01S 5/0289
10,466,700 B1 * 11/2019 Carmack ................ G05D 1/101
12,007,487 B1 * 6/2024 Robinson ............ B60W 50/029
12,299,080 B2 * 5/2025 Jonietz ................... G06N 3/084
2003/0146871 A1 * 8/2003 Karr ...................... G01S 5/0009 342/465
2004/0166877 A1 * 8/2004 Spain, Jr. .............. H04W 64/00 455/456.6
2011/0201357 A1 * 8/2011 Garrett ...................... G01S 5/12 455/456.2
2012/0190380 A1 * 7/2012 Dupray ................ G01S 5/0278 455/456.1
2012/0218145 A1 * 8/2012 Kee ......................... G01S 19/11 342/357.48
2016/0154113 A1 * 6/2016 Leibner ................... G01S 19/21 342/357.59
2017/0057634 A1 * 3/2017 Hunt ..................... G01S 19/215
2017/0070971 A1 * 3/2017 Wietfeldt .............. H04W 24/10
2021/0080593 A1 * 3/2021 Lewis ................... G01S 19/215
2021/0263166 A1 * 8/2021 Zheng ................... G01S 19/396
(Continued)

*Primary Examiner* — Yuwen Pan
*Assistant Examiner* — Samuel H. Leonard
(74) *Attorney, Agent, or Firm* — Fleit Intellectual Property Law; Jeffrey N. Giunta

(57) ABSTRACT

What is disclosed is a GNSS based navigation operations monitoring system and method. Reports are received from a number of stations that indicate: locations of the station by a GNSS receiver; reported locations of a vehicle determined by a GNSS receiver and communicated in a location reporting signal transmitted by the vehicle; and received signal strength of the location reporting signal. GNSS navigation abnormalities are determined based on inconsistencies between reported locations of the vehicle and the received signal strengths. A geographic location of the abnormality is reported based on determining the GNSS navigation abnormality.

16 Claims, 9 Drawing Sheets

(56) References Cited

U.S. PATENT DOCUMENTS

2021/0311203 A1* 10/2021 Reis ........................ G01S 19/21
2021/0333411 A1* 10/2021 Gum ....................... G01S 19/21
2022/0182785 A1* 6/2022 Edge ..................... H04W 4/025
2022/0221587 A1* 7/2022 Tuck ..................... G01S 19/215
2022/0244406 A1* 8/2022 Wang ...................... G01S 19/05
2022/0295229 A1* 9/2022 Lapidot ................... G01S 5/163
2022/0317312 A1* 10/2022 Sharma ................. G01S 19/215
2022/0350031 A1* 11/2022 Lewis ................... G01S 19/215
2022/0350032 A1* 11/2022 Gick ..................... G01S 19/215
2023/0003898 A1* 1/2023 Wang ...................... G01S 19/29
2023/0007488 A1* 1/2023 Mallya .................. H04W 4/023
2023/0055363 A1* 2/2023 Su ........................... G01S 19/23
2023/0152471 A1* 5/2023 Nekoui ................. G01S 19/396
342/357.64
2023/0280477 A1* 9/2023 Seth ....................... G16H 50/30
342/357.23
2023/0362871 A1* 11/2023 Edge ..................... G01S 5/0009
2024/0019581 A1* 1/2024 Joseph ................... H04K 3/255

* cited by examiner

SATELLITE RADIO NAVIGATION OPERATIONS MONITORING SYSTEM AND METHOD

TECHNICAL FIELD

The present invention is directed to monitoring radio navigation systems and, more particularly, to monitoring interference and operations of satellite-based radio navigation systems.

BACKGROUND

A Global Navigation Satellite Systems (GNSS) is a type of radio navigation system where multiple satellites each transmit one or more signals that are received by navigation devices to determine the devices' locations, velocities, and potentially other data. GNSSs, such as the U. S. maintained Global Positioning System (GPS) have become an often used element of radio navigation systems and are relied upon by many users to determine precise location, speed, and potentially other quantities such as precise time. The radio signals used by a GNSS are vulnerable to interference and potentially spoofing to cause erroneous navigation data to be produced by a receiver.

BRIEF SUMMARY

What is disclosed is a method for monitoring GNSS based navigation operations that includes receiving a plurality of reports having at least one respective report from each respective station in a plurality of stations, each respective report including: a respective indication of a respective determined location, as determined by a GNSS receiver, of the respective station at a respective time; a respective indication of a respective reported location of a vehicle, where the respective reported location is determined by a GNSS receiver and is communicated in a respective location reporting signal transmitted by the vehicle; and a respective indication of a respective received signal strength, at the respective station, of the respective location reporting signal. The method further includes: determining, based on inconsistencies between respective indications of respective reported locations of the vehicle and respective indications of respective received signal strengths within the plurality of reports, a likelihood of GNSS based navigation abnormality in a vicinity of at least one of the stations in the plurality of stations or the vehicle; and reporting, based on determining the likelihood of GNSS based navigation abnormality, a geographic location of the likelihood of GNSS based navigation abnormality.

What is also disclosed is a GNSS based navigation operations monitoring system that includes a processor, a memory that is communicatively coupled to the processor, and a report receiver that is communicatively coupled to the processor and the memory and is configured to, when operating, receive a plurality of reports include at least one respective report from each respective station in a plurality of stations. Each respective report includes: a respective indication of a respective determined location, as determined by a GNSS receiver, of the respective station at a respective time; a respective indication of a respective reported location of a vehicle, where the respective reported location is determined by a GNSS receiver and is communicated in a respective location reporting signal transmitted by the vehicle; and a respective indication of a respective received signal strength, at the respective station, of the respective location reporting signal. The processor is also configured to, when operating, determine, based on inconsistencies between respective indications of respective reported locations of the vehicle and respective indications of respective received signal strengths within the plurality of reports, a likelihood of GNSS based navigation abnormality in a vicinity of at least one of the stations in the plurality of stations or the vehicle; and report, based on determining the likelihood of GNSS based navigation abnormality, a geographic location of the likelihood of the GNSS based navigation abnormality.

What is further disclosed is a GNSS based navigation operations monitoring station that includes a processor; a memory communicatively coupled to the processor, and a GNSS receiver that is communicatively coupled to the processor and the memory and is configured to: receive GNSS signals from one or more GNSS constellations; and process the GNSS signals to determine a determined location of the GNSS based navigations operations monitoring station. The GNSS based navigation operations monitoring station also includes a location reporting signal receiver that is communicatively coupled to the processor and the memory and is configured to: receive a location reporting signal transmitted by a vehicle where the location reporting signal includes an indication of a reported location of the vehicle; and determine a signal strength of the location reporting signal. The processor, when operating, is also configured to: determine a calculated distance between the determined location and a location of the reported location of the vehicle; and determine, based on inconsistencies between the indication of reported location of the vehicle and the signal strength of the location reporting signal, a likelihood of GNSS based navigation abnormality in a vicinity of at least one of the GNSS based navigations operations monitoring station or the vehicle; and send a report including an indication of the likelihood of GNSS based navigation abnormality in a vicinity of at least one of the GNSS based navigations operations monitoring station or the vehicle.

Features and advantages of the above-described apparatus and direct to object print method and system will become readily apparent from the following description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Non-Limiting Definitions

Figure 1:
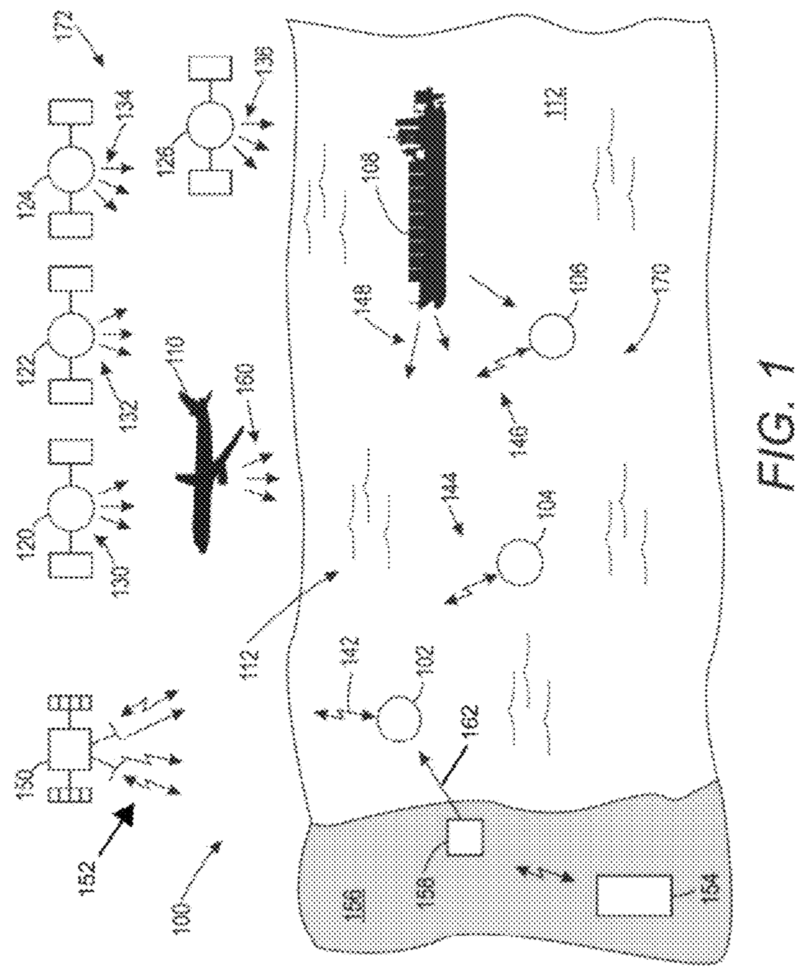
FIG. 1 illustrates an operational environment for a satellite radio navigation operations monitoring system, according to an example.

A "Global Navigation Satellite System," which is often referred to by its abbreviation "GNSS," is a broad, general reference to any satellite constellation that provides one or more of Positioning, Navigation, or Timing (PNT) services on a global or regional basis. A GNSS generally operates based on a number of orbiting satellites that transmit specialized signals that are able to be received and processed by specially designed receivers that provide PNT data based on determining timing relationships between and among the signals received from the different satellites. Non-limiting examples of GNSS are the Global Positioning System (GPS) operated by the United States, Galileo operated by the European Union, BeiDou navigation Satellite System (BDS) operated by the People's Republic of China, GLONASS operated by the Russian Federation, Indian Regional Navigation Satellite System (IRNSS)/Navigation Indian Constellation (NavIC) operated by the Government of India and is designed to cover the Indian Region, and the Quasi-Zenith Satellite System (QZSS) owned by the Government of Japan.

"Global Navigation Satellite System based navigation operations" broadly refers to operations that use one or more GNSS constellations to perform one or more of Positioning, Navigation, or Timing. Such operations are able to be performed with GNSS receivers that operate with one or more constellations where those GNSS receivers are located on any type of vehicle that is able to be on one or more of land, on or in water, on airborne platforms, other environments, or combinations of these. These operations are able to be affected by intentional or accidental interference or spoofing of GNSS signals that are transmitted by the GNSS satellites.

"Monitoring Global Navigation Satellite System based navigation operations" broadly refers to performing any observations of signals involved in the performance of navigation operations that use one or more GNSS constellations. Non-limiting examples of such monitoring includes one or more of receiving, monitoring or characterizing GNSS signals that are transmitted by the various satellites in a GNSS constellation, one or more of receiving signals transmitted by vehicles that report their positions as determined by GNSS receivers on that vehicle, or combinations of these.

A "GNSS receiver" is a broad reference to any device that is capable of receiving one or more types of GNSS signals and processing those signals to produce a geographic location of the antenna receiving those GNSS signals. In various examples, a GNSS receiver is able to be a stand-alone device or equipment that is integrated or incorporated into other devices.

A "vehicle" is a broad reference to any structure, item, element, or the like that performs at least one of positioning, navigation, or timing, based on processing received GNSS signals. Vehicles, as used herein, refer to any such structure, item, element or the like that is able to exist, travel, or be stationary on the ground, on or in water, or in the air.

A "station" is a broad reference to any system or location with equipment to monitor any one or more signals associated with GNSS based navigation operations. In various examples, a station is able to perform one or more of receiving or monitoring received GNSS signals that are transmitted by satellites, receiving or processing received location reporting signals as are transmitted by various vehicles, other monitoring of GNSS signals, or combinations of these. In various examples, a station is able to be stationary, mobile, transportable, or otherwise moving. In various examples, stations are able to be ground based, airborne, seaborne, or a station is able to be a combinations of these.

A "GNSS based navigation operations monitoring station" is a broad reference to a station that is able to be any system or location with equipment to monitor any one or more signals associated with GNSS based navigation operations A "report" is a broad reference to any communication that conveys data. In various scenarios, a report refers to any data sent from a station that conveys data that has been received, collected, produced by analysis or other means, other data, or combinations of these.

A "location reporting signal" is a broad reference to any signal transmission that conveys a location of the entity transmitting that signal. Examples of location reporting signals include, but are not limited to, the below described examples of AIS and ADS-B transmissions from vehicles reporting their location where that location is often determined by processing within a GNSS receiver.

A "floating station" is a broad reference to any type of station that is able to monitor GNSS based navigation operations. In some examples, floating stations include, but are not limited to, devices that are able to float in the water and that may or may not be freely driving, moored in place, or self propelled. In some examples, an ocean drifter is able to include one or more of various radio receiving equipment, processing equipment, data communications transceivers, energy storage such as batteries, energy sources such as solar cells, other elements, or combinations of these.

An "ocean drifter" is a broad reference to any type of station that is able to monitor GNSS based navigation operations. In some examples, ocean drifters are a class of floating stations that include, but are not limited to, devices that are able to float in the water and that follow flowing water currents to cause the ocean drifters to move around areas of water without providing propulsion themselves. In some examples, ocean drifters are able to include a means of propulsion of some degree. In some examples, an ocean drifter is able to include one or more of various radio receiving equipment, processing equipment, data communications transceivers, energy storage such as batteries, energy sources such as solar cells, other elements, or combinations of these.

An "indication of determined location" is broadly understood to refer to any indication of two or three dimensional coordinates of an object, where those coordinates are determined at least in part by processing of GNSS signals. Such coordinates are able to be specified with regard to any frame of reference, in any coordinate system, in any format, or combinations of these.

An "indication of received signal strength" is broadly understood as any indication of a received strength or quality of a received signal. Indications of received signal strength include, but are not limited to, indications of an estimated distance over which the received signal has traveled from its transmitter, indications of the robustness of the received signal, such as one or more of a signal-to-noise ratio of the signal, a "received signals strength indicator" (RSSI) of a signal, other quantities, or by combinations of these.

A "GNSS based navigation abnormality" is a broad reference to any inconsistency, disturbance, irregularity, error, other abnormality, or combinations of these, that occur within GNSS based navigation operations.

"Inconsistencies between respective indications of respective reported locations of the vehicle and respective indications of respective received signal strengths within the plurality of reports" is a broad reference to any mathematical inconsistency that invalidates the assumed physical similarity between reported locations of the vehicle and received signal strengths of signals transmitted by the vehicle given the distance of the vehicle from the receiving station.

An "affected geographic area" is a geographic area in which it is determined that vehicles are sending reports of their locations that are inconsistent with observations made by stations receiving those reports from the vehicles. In an example, an affected geographic area is an area in which all vehicles report locations that are inconsistent with other observations associated with those vehicles, and where there are vehicles outside that affected geographic area that report locations that are not inconsistent with other observations associated with those vehicles.

A "geographic location of an abnormality" is a broad reference to a geographic area in which a GNSS based navigation abnormality exists. Such an area is able to be specified as a two dimensional geographic area or a three-dimensional area that also specifies an altitude range in which a GNSS based navigation abnormality is observed.

A "time sequence of signal-to-noise ratios of GNSS signals" is a broad reference to a time profile of signal-to-noise ratios of GNSS signals from one or more GNSS satellites that are measured at a station over a period of time. In an example, that period of time is sufficient to measure signal-to-noise ratios over a range of azimuth values and elevation values for the satellite relative to the station. In an example, the determined signal-to-noise ratios are stored in association with the azimuth and elevation values to the GNSS satellite from the station.

An "Interference Report" is a broad reference to any communication that identifies a decrease in signal quality of one or more received GNSS signals. For example, radio interference in the Radio Frequency, or "RF" band of GNSS signals will decrease the signal-to-noise ratio of the GNSS signals received by receivers and thus degrade the performance of that receiver.

An "Automatic Identification System" or "AIS" signal is a broad reference to signals transmitted by vehicles, typically by boats and ships, that convey information identifying the vehicle and providing an indication of determined location.

An "Automatic Dependent Surveillance-Broadcast" or "ADS-B" signal is a broad reference to signals transmitted by vehicles, typically by aircraft, that convey information identifying the vehicle and providing an indication of determined location.

A "Dedicated RF Receiver" is a broad reference to a radio receiver that is configured to receive one or more particular RF signals. A dedicated RF receiver is able to include configurable processing components that allow variation of processing to be performed on the particular RF signals.

A "Software Defined Radio" or "SDR" is a broad reference to a software reconfigurable RF processor that is able to be reconfigured to process various different RF signals.

A "General Radio Receiver" is a broad, general term referring to any device that is able to receive and process RF signals. General radio receivers are able to include, without limitation, one or more of a dedicated RF receiver, a software defined radio, any other receiver, or combinations of these.

A "location reporting signal receiver" is a broad reference to any receiver that is configured to receive location reporting signals, such as AIS or ADS-B signals. A location reporting signal receiver is able to be a dedicated RF receiver, a software defined radio, any other type of receiver, or combinations of these.

Operational Environment

FIG. 1 illustrates an operational environment for a satellite radio navigation operations monitoring system 100, according to an example. The satellite radio navigation operations monitoring system 100 depicts an example set of components that are able to be contained in a satellite radio navigation operations monitoring systems. The number of components in this example is chosen in order more clearly describe relevant aspects of this example. In further examples, satellite radio navigation operations monitoring systems are able to include any number of components.

The operational environment for a satellite radio navigation operations monitoring system 100 depicts four (4) satellites of a Global Navigation Satellite System (GNSS) 172, such as the Global Positioning System (GPS) that is operated by the U. S. Government. In general, a GNSS has a number of satellites that orbit the earth to provide global coverage and a particular receiver may be in view of more than four (4) satellites at a time. The depicted example includes satellite 1 120, satellite 2 122, satellite 3 124, and satellite 4 126. In an example, each satellite of a GNSS transmits one or more signals that are able to be received by suitable receivers that are in sight of that satellite and processing in those receivers is able to determine the location of that receiver on the earth. In the operational environment for a satellite radio navigation operations monitoring system 100, the first satellite 120 broadcasts a first radio navigation signal 130, the second satellite 122 broadcasts a second radio navigation signal 132, the third satellite 124 broadcasts a third radio navigation signal 134, and the fourth satellite 126 broadcasts a fourth radio navigation signal 136. As is understood by practitioners of ordinary skill in the relevant arts, receivers on various platforms that are in view of the multiple GNSS satellites 172 are able to receive these signals from those multiple satellites and are able to process those signals to determine geographic location, velocity, time of day, and potentially other data.

The satellite radio navigation operations monitoring system 100 depicts an ocean 112 in which three ocean drifters 170 are floating and drifting. The ocean drifters 170 are examples of floating stations and include an ocean drifter 1 102, an ocean drifter 2 104, and an ocean drifter 3 106. In further examples, any type of floating station, or other stations, are able to be included in satellite radio navigation operations monitoring systems.

As described in further detail below, each ocean drifter in an example, is able to receive one or more types of Global Navigation Satellite System (GNSS) signals, such as GPS signals, to evaluate the received signal quality of these signals. The ocean drifters 170 in some examples also process received GNSS signals to determine location, velocity, and time data for the ocean drifter based upon the signals received from the GNSS satellites.

Each ocean drifter in an example, as is described in further detail below, further includes one or more other radio receiver(s) that is or are able to receive radio signals in one or more radio bands. Such other radio receivers in an example are able to receive vehicle reporting signals, such as Automatic Identification System (AIS) signals that transmit reported locations from ships, Automatic Dependent Surveillance-Broadcast (ADS-B) signals that transmit reported locations from aircraft, other signals, or combinations of these. In some examples, these other radio receivers are able to process radio signals received by these other radio receivers in order to determine characteristics of the received signals, extract data conveyed by those radio signals, determine other information, bit error rates, or combinations of these. These other radio receivers in some examples are able to be general radio receivers that are able to receive and process radio frequency (RF) signals in one or more RF bands to, for example, characterize radio signal energy in those received bands. In an example, such a general radio receiver is able to detect and characterize interference signals, such as jamming signals, in one or more RF bands such as GNSS bands. In some examples, these radio receivers are able to incorporate Software Defined Radios (SDRs) to provide a single, lightweight device that is able to be reconfigured to receive various types of radio signals. Additional other radio receivers are also able to be included in ocean drifters 170 that are fixed purpose receivers designed to process one type of radio signal, such as an AIS signal.

The satellite radio navigation operations monitoring system 100 depicts a land area 156 that is adjacent to the ocean 112. The illustrated land area 156 depicts examples of a GNSS radio signal interference source 158 and a central control and processing system 154. The depicted GNSS radio signal interference source 158 and central control and processing system 154 are examples used to illustrate relevant concepts of the illustrated monitor system. In general, one or more GNSS radio signal interference source 158, central control and processing system 154, or both, are able to be located on land or on vehicles of any type, including land-based vehicles, seaborne platforms, airborne platforms, or combinations of these.

The GNSS radio signal interference source 158 in this example transmits a GNSS interference signal 162. As described in further detail below, the GNSS interference signal 162 is designed to interfere with GNSS signal reception in the area of the GNSS radio signal interference source 158. In various examples, a GNSS radio signal interference source 158 is able to transmit radio signals that, for example, contain navigation spoofing signals that induce errors in the GNSS receivers that receive the GNSS interference signal 162, contain noise or other interference signals that interfere with or preclude reception of actual GNSS signals transmitted by the GNSS satellites, other signals, or combinations of these.

The central control and processing system 154 in an example is in radio communications with the ocean drifters 170. In the illustrated example, the central control and processing system 154 communicates with the ocean drifters 170 via a data communications satellite 150. The central control and processing system 154 in an example operates to send commands to the ocean drifters 170 to control and direct their operations. The central control and processing system 154 also receives data back from the ocean drifters 170 that indicates observations, measurements, processing results, other quantities, or combinations of these, that are performed, obtained, or produced by the ocean drifters 170.

In an example, the data communications satellite 150 supports data communications between the central control and processing system 154 and the ocean drifters 170. The data communications satellite 150 has data links 152 to communicate data with both the central control and processing system 154 and the ocean drifters 170. In an example, the data communications satellite operates as a data relay in both directions between the endpoints of each of the ocean drifters 170 and the central control and processing system 154.

The ocean drifters 170 in an example each include a control and reporting radio transceiver that is able to receive commands from, and transmit data to, the central control and processing system 154 via a respective data communications link that reaches the data communications satellite 150 as data link 152. Ocean drifter 1 102 has a first data communications link 142, ocean drifter 2 104 has a second data communications link 144, and ocean drifter 3 106 has a third data communications link 146. These data communications links in an example are bi-directional. Data transmitted to the central control and processing system 154 includes, for example, detected anomalies and detected data received from vehicles. In some examples, the ocean drifters 170 have processors that perform autonomous processing to determine or detect anomalies or defined conditions that are reported to the central control and processing system 154. In some examples, the ocean drifters 170 are able to communicate with other components of a satellite radio navigation operations monitoring system 100 by any one or more suitable techniques.

The operational environment for a satellite radio navigation operations monitoring system 100 shows a ship 108 and an aircraft 110. In the illustrated example, antennas for GNSS receivers on each of the three (3) ocean drifters 170, on the ship 108, and on the aircraft 110 are all in view of the four (4) GNSS satellites and are able to receive the signals transmitted by each of those satellites. A GNSS signal receiver on each of these vehicles is able to process the received GNSS signals and determine the location, velocity, and other information for the device to which the receiver is mounted.

The ship 108 and the aircraft 110 in this example send radio signals that report their locations as are determined by the GNSS receiver on that vehicle. The ship 108 reports its location as part of the data in an Automatic Identification System (AIS) broadcast 148. The aircraft 110 transmits its location as part of the data in an Automatic Dependent Surveillance-Broadcast (ADS-B) broadcast 160. In general, ocean drifters 170 within sight of the vehicle broadcasting its location are able to receive location broadcast signals, e.g., an AIS or ADS-B broadcast signal, that are broadcast from vehicles that are within radio reception range of that ocean drifter.

Figure 2:
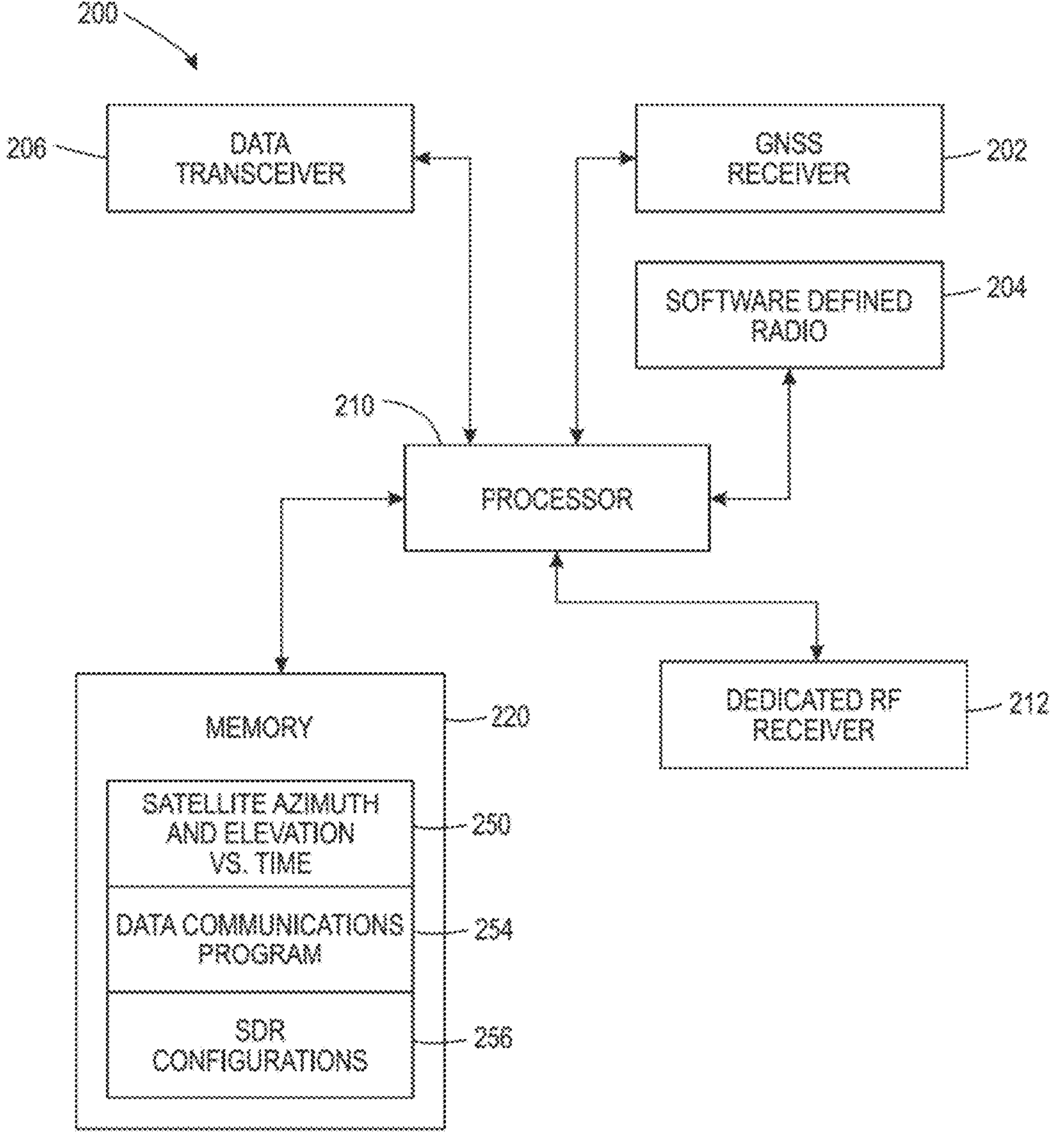
FIG. 2 illustrates an ocean drifter block diagram, according to an example.

FIG. 2 illustrates an ocean drifter block diagram 200, according to an example. The illustrated ocean drifter block diagram 200 depicts components of an example ocean drifter, such as one of the above-described ocean drifters 170. The description of the ocean drifter block diagram 200 refers to elements discussed above with regards to the operational environment for a satellite radio navigation operations monitoring system 100. The components depicted in the ocean drifter block diagram 200 are selected to simplify the description of relevant aspects of the described example and are to be understood as depicting a representative design of a practical ocean drifter. In various examples, practical ocean drifters are able to be realized with other architectures or designs.

The ocean drifter block diagram 200 includes a processor 210 and an associated memory 220. The processor 210 in an example, performs various functions to control the ocean drifter, process various data elements to determine related information, perform other functions, or combinations of these. The memory 220 in various examples is used to support processing performed by the processor 210 in various ways, as is known by practitioners of ordinary skill in the relevant arts. The memory 220 in an example includes non-volatile storage that stores program code configured to cause the processor to perform processing such as is described in detail below.

The ocean drifter block diagram 200 includes a data transceiver 206. The data transceiver 206 in an example, performs bi-directional data communications between the ocean drifter and other systems that are separate from the ocean drifter. In an example, the data transceiver 206 provides bi-directional data communications via data communications satellite 150. In an example, the data transceiver 206 operates with Iridium® data communications satellites to provide bi-directional communications with the central control and processing system 154.

The ocean drifter block diagram 200 includes a GNSS receiver 202. In various examples, the GNSS receiver 202 is able to receive and process radio navigation signals from one or more Global Navigation Satellite Systems (GNSSs) in order to determine various information such as a present location of an antenna receiving the radio navigation signals, time, signal characteristics such as signal-to-noise ratios or the like, various other information, or combinations of these. The GNSS receiver 202 in an example, operates under the control of the processor 210 and provides to the processor 210 determined information, such as determined locations, present time of day, received signal strength for each of the received navigations signals received from each GNSS satellite, other information, or combinations of these.

The ocean drifter block diagram 200 includes, in the illustrated example, a Software Defined Radio (SDR) 204. The SDR 204 in an example is a general purpose, reconfigurable signal processing subsystem that is able to be reconfigured to receive, demodulate, decode and process data contained in various types of transmitted RF signals. In some examples, the SDR 204 is able to be configured to receive and process ADS-B signals. In some examples, the SDR 204 is able to be configured to perform any suitable type of signal processing, signal characterization, other operations, or combinations of these. In an example, the SDR 204 has a configurable front end that allows Radio Frequency (RF) signals in various RF bands to be received and down converted for conditioning and digitization. The digitized down converted signal in that example is able to be further processed by configurable digital processing hardware contained in the SDR.

The ocean drifter block diagram 200 includes a dedicated RF receiver 212. The dedicated RF receiver 212 in an example, is a receiver designed to receive and process a particular type of RF signal. For example, an ocean drifter is able to include a dedicated RF receiver 212 that is an example of a location reporting signal receiver that is designed to receive and process RF signals transmitted by an Autonomous Identification System (AIS) transmitter in order to receive and determine vehicle identification and reported location information contained in the received AIS signal. In an example, a dedicated RF receiver 212 is able to be optimized to process a particular signal and perform particular processing. Such optimizations in an example, result in the dedicated RF receiver 212 operating more efficiently, such as by using less electrical power, generating less heat, having other advantages, or combinations of these, over a more general-purpose receiver such as the SDR 204 described above.

The ocean drifter block diagram 200 includes a memory 220 that stores data used by the processor 210 for processing as well as executable computer readable programs. The depicted memory 220 includes a satellite azimuth and elevation (AZ/EL) verses time storage 250, which stores the azimuth and elevation from the station, e.g., this particular ocean drifter, to each GNSS satellite whose signal is being received at various times, and a signal-to-noise ratio verses azimuth and elevation (AZ/EL) storage, which stores signal-to-noise ratios of GNSS signals in association with the concurrent azimuth and elevation of the satellite from the station. The memory 220 further has a data communications program 254 that is executed by the processor 210 to perform data communications via the data transceiver 206. The memory 220 also has a software defined radio (SDR) configuration storage 256 that stores various configurations for the software defined radio (SDR) 204 to process various received signals.

Figure 3:
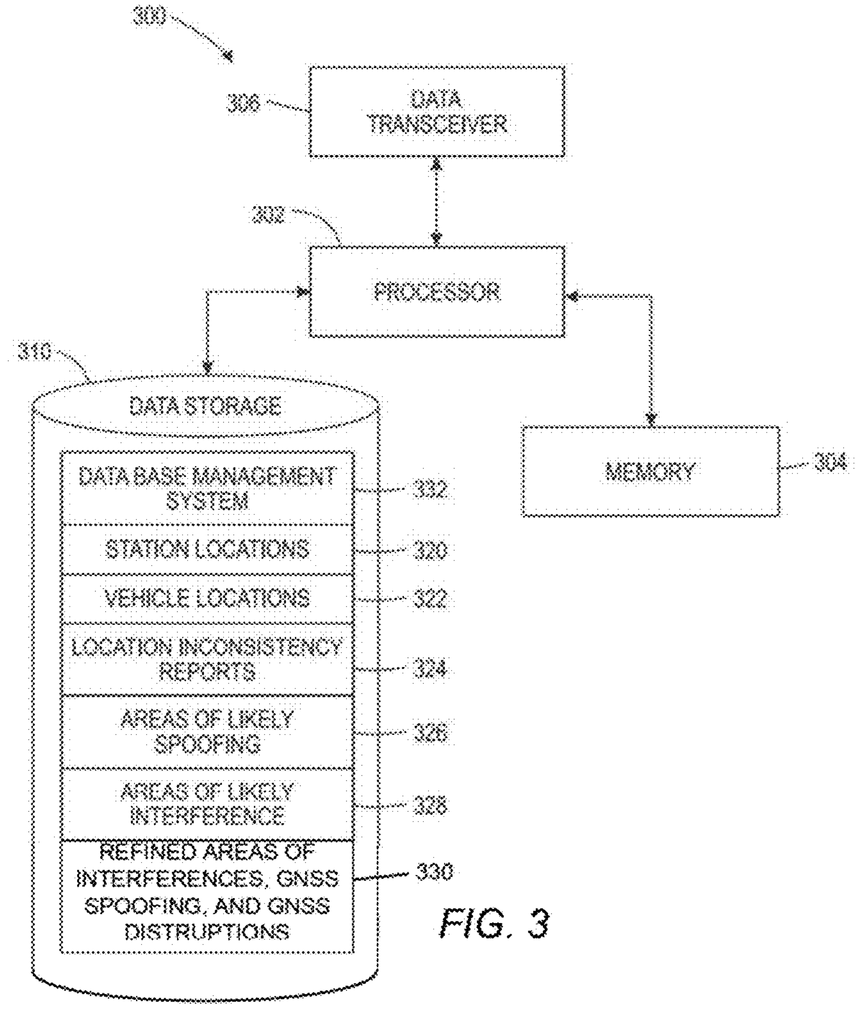
FIG. 3 illustrates a central control and processing system block diagram, according to an example.

FIG. 3 illustrates a central control and processing system block diagram 300, according to an example. The central control and processing system block diagram 300 is an example of components contained in the above-described central control and processing system 154. As discussed above, the central control and processing system 154 in an example, exchanges data with one or more ocean drifters 170 to monitor GNSS operations. The illustrated central control and processing system block diagram 300 depicts processing components that operate in conjunction with one or more monitoring stations in order to perform monitoring of GNSS operations over a large area. In various examples, other components are able to be included in the central control and processing system block diagram 300, some or all components are able to be distributed across multiple physical locations, are able to include other processing architectures, or combinations of these.

The central control and processing system block diagram 300 includes a data transceiver 306. The data transceiver 306 is an example of a report receiver and in an example is compatible with the above-described data transceiver 206 discussed above with regards to the ocean drifter block diagram 200. The data transceiver 306 in an example is able to communicate with the ocean drifters 170 via the above-described data communications satellite 150. In some examples, the data transceiver 306 is able to provide communications via a data communications satellite 150 by connecting to a remote ground station by any suitable techniques, such as via one or more of terrestrial data links, wired data links, an Internet connection, other links, or combinations of these.

The central control and processing system block diagram 300 includes a processor 302 that in an example is configured to perform various processes that are described below. In general, the processor 302 is able to perform or control any processing to be performed by the central control and processing system 154. The processor 302 operates in conjunction with a memory 304 that is used to, for example, store programs, data, other information, or combinations of these, to support operations of the processor 302 and the central control and processing system 154 in general. In an example, the processor 302 is able to process messages sent between ocean drifters 170 and the central control and processing system 154 by, for example, operating to perform encoding, decoding, encrypting, decrypting, or combinations of these, on those messages.

The central control and processing system block diagram 300 includes a data storage 310 that stores various information, programs, data, other structures, or combinations of these, for use by the processor 302 or other elements. The data storage 310 in an example includes a data base management system 332, other data storage control components, or combinations of these, to store, manage, selectively retrieve and further process data to be stored therein. In various examples, the processor 302 does one or more of determining data to be stored in the data storage 310, formats in which the data is to be stored, which data is to be retrieved, other processing, or combinations of these.

The data storage 310 in an example stores data received in reports from various stations, such as ocean drifters 170, including storing station location 320, reported vehicle locations 322, location inconsistency reports 324, areas of likely spoofing 326, and areas of likely interference 328. The data storage 310 further stores refined areas of interferences, GNSS spoofing, and GNSS disruptions 330 that are determined based on processing performed by the processor 302 to synthesize and harmonize the data received in the various reports and stored in the data storage 310. In general, the data stored in the data storage 310 is determined or received by various techniques. Some examples of techniques or sources for determining or receiving the data in the data storage 310 are described below.

In various examples, station locations 320 include an identifier of the ocean drifter that has reported its location along with the location information. In some examples, the station location 320 stores one or more of a time series of location information for each ocean drifter that includes, for example, a time of the location, the latitude, longitude, altitude, of the determined location, information concerning the operations of the GNSS receiver that determined the location such as satellites whose signals were received, the received signal quality of the signal from each of those satellites, other information, or combinations of these.

Data stored in the vehicle locations 322 in some examples include one or more of a vehicle identifier, location as reported by the vehicle, estimated distances to that vehicle from a reporting ocean drifter, an identification of the ocean drifter that received and reported the received vehicle location report, signal characteristics of the signal containing the vehicle location report such as signal-to-noise ratio, other information, or combinations of these.

Data stored in the location inconsistency reports 324 includes identification of vehicles whose reported location is inconsistent with other observations made at the time the vehicle reported its location. Such data is able to include in some examples, an identification of an ocean drifter that received the location report from the vehicle, identification of the vehicle, other data, or combinations of these. In various examples, data supporting some or all of the information in the location inconsistency report data is able to be determined by processing in an ocean drifter, by processing in the central control and processing system 154, by other processors, or by any combinations of these processors.

The areas of likely spoofing 326, and areas of likely interference 328 store geographic areas that have been determined to likely have spoofing or interference, respectively, of the GNSS signals. Examples of processing to determine these areas are described below.

Figure 4:
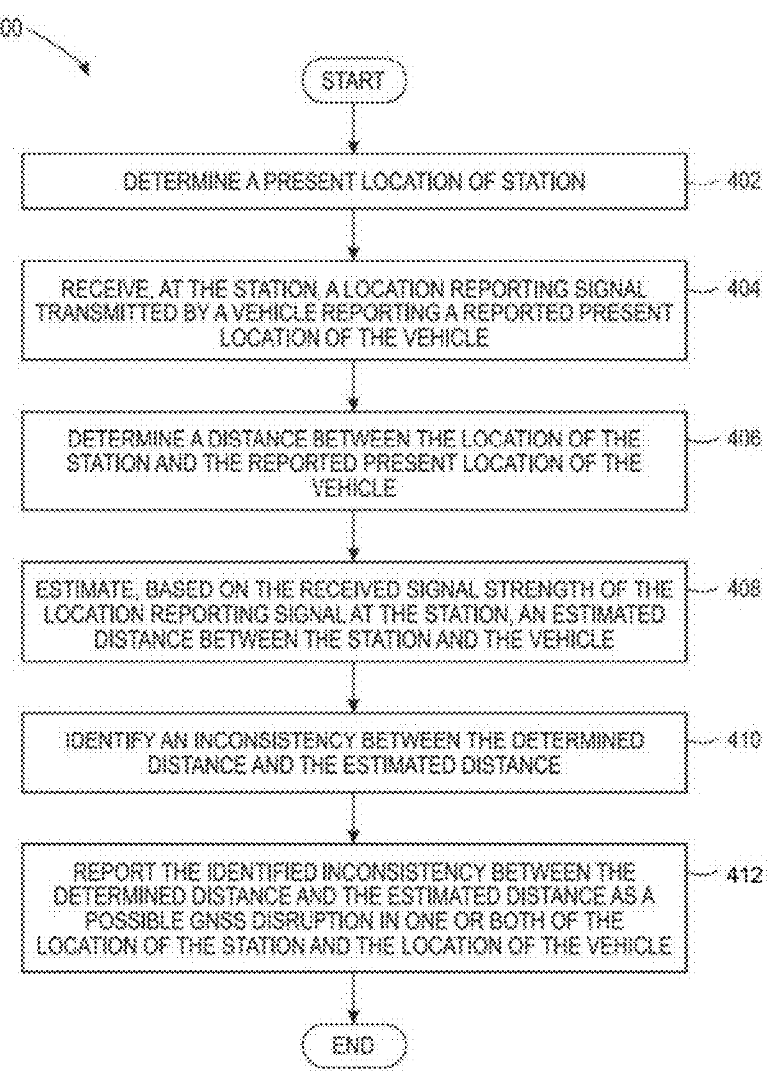
FIG. 4 illustrates a station processing flow, according to an example.

FIG. 4 illustrates a station processing flow 400, according to an example. The station processing flow 400 depicts an example of processing performed within a monitoring station, such as each of the above-described ocean drifters 170. For example, the station processing flow diagram depicts processing performed by processor 210 that is within one of the ocean drifters 170, such as ocean drifter 1 102, discussed above.

The station processing flow 400 starts with determining, at 402, a location of the station. In an example, the location of the station is determined based on processing by a GNSS receiver 202, such as a GPS receiver or receiver that processes other radio navigation signals to determine a device's location on the earth. In further examples, the location of the station is able to be determined by any suitable technique.

The station processing flow 400 receives, at 404, a location reporting signal transmitted by a vehicle reporting a reported present location of the vehicle. In an example, the reported present location is a location of the vehicle within a specified period of time before or after the location of the station is determined. In some examples, the time for which the reported present location is indicated is considered if it is within a threshold of the time at which the location of the station is determined.

In various examples, this received location reporting signal is an Automated Information Service (AIS) signal transmitted by a ship, an ADS-B broadcast 160 transmitted by an aircraft, another type of signal containing reported location information, or combinations of these. In general, this received location reporting signal is able to contain geographic location information for the vehicle that is transmitting the signal. In some examples, the location reporting signal also includes information such as vehicle identification, other information, or combinations of these. In the examples described in the following description, AIS and ADS-B broadcasts are to be understood as containing information identifying the vehicle transmitting the broadcast.

The station processing flow 400 determines, at 406, a distance between the location of the station, such as one of the ocean drifters 170 and the reported present location of the vehicle as specified in the above received location reporting signal. This distance is an example of a calculated distance. In an example such as is illustrated in the satellite radio navigation operations monitoring system 100, the distance between the ocean drifter 3 106 and ship 108 is determined. In an example, this distance is determined based on a geometric difference between the location determined for ocean drifter 3 106, as determined by a GNSS receiver on that ocean drifter, and the reported location specified in the location reporting signal received from that vehicle, such as is contained in an AIS broadcast sent from the ship 108.

An estimated distance is then estimated, at 408, based on the received signal strength of the received location reporting signal. In an example, a receiver at the station that is receiving the location reporting signal is able to determine the received signal strength of the AIS signal 148 or ADS-B broadcast 160 based on processing of that signal.

In some examples, an estimated effected radiated power of the location reporting signal transmitted by the vehicle is able to be determined in order to refine an estimate of the distance between the vehicle and the station. In an example, the received signal indicates the type of vehicle transmitting the location reporting signal. Based on vehicle type, a likely transmitter type can be assumed and a likely effective radiated power level of that type of transmitter can be estimated. For example, a received AIS broadcast that indicates the broadcast was transmitted by a larger ocean vehicle is likely to have a more powerful AIS transmitter than an AIS transmitter that would be on a smaller vehicle. In such an example where the AIS broadcast indicates that the location reporting signal is sent by a larger ocean vessel, processing is able to estimate a transmitted signal strength of the transmitted AIS signal, given vessel type. The processing is thereby able to more accurately determine the RF signal attenuation experienced between the vehicle and the station based on received signal strength because of the estimate of the initial transmitted signal strength at the vehicle. Based on the RF signal attenuation, the distance the RF signal traveled can be determined. In the illustrated example, the distance between the receiving ocean drifter 3 106 and the ship 108 is able to be estimated by determining the received signal strength of an AIS broadcast received at ocean drifter 3 106, estimating its original transmission power based on the class of vehicle as indicted by identification information contained in the AIS broadcast, and determining the amount of attenuation that transmitted signal experienced in propagating between the ship 108 and ocean drifter 3 106. The distance of such propagation that corresponds to the estimated attenuation is able to be determined by known techniques. It is to be noted that based on the above, an indication of the distance between the receiving station and the transmitter on a vehicle is thereby an indication of received signal strength.

An inconsistency is identified, at 410, between the determined distance and the estimated distance. In an example, identification of such an inconsistency is based on a difference between the determined distance and the estimated difference being greater than a threshold. In an example, this inconsistency in an example is able to be the result of the vehicle transmitting the received location reporting signal sending an inaccurate present location in the transmitted location reporting signal received at the vehicle. That inaccurate present location in some examples may be due to, for example, intentional inaccuracies on the part of the vehicle operator in reporting location, spoofing of the GNSS signal by one or more interfering transmitters in the area of the vehicle, other causes, or combinations of these. That inconsistency is also able to be caused by, for example, spoofing of the GNSS signal by one or more interfering transmitters in the area of the station. In some examples, similar spoofing of the GNSS signals at both the station and the vehicle may result in a similar amount of location shifting of the determined location at both the station and the vehicle. It is to be noted that in the case of such a similar amount of location shifting, an inconsistency between the determined distance and the estimated difference may not be identified in that scenario. In some examples, a likelihood of GNSS based navigation abnormality in a vicinity of at least one of the stations in the plurality of stations or the vehicle is determined based on such inconsistencies between indications of reported locations of the vehicle and indications of received signal strengths.

The identified inconsistency between the determined distance and the estimated difference is reported, at 412, as a possible GNSS disruption in one or both of the locations of the station and the location of the vehicle. Reporting of such an inconsistency at these locations is an example of reporting, based on determining the likelihood of GNSS based navigation abnormality, a geographic location of the abnormality. In an example, this report is sent to the above-described central control and processing system 154. In some examples, determinations of the determined distance being consistent with the estimated distance are not reported or only reported occasionally, such as limiting such reports to a specified number of reports in a given time frame, in order to reduce the amount of reporting traffic sent from the station to the central control and processing system 154. The station processing flow 400 then ends.

Figure 5:
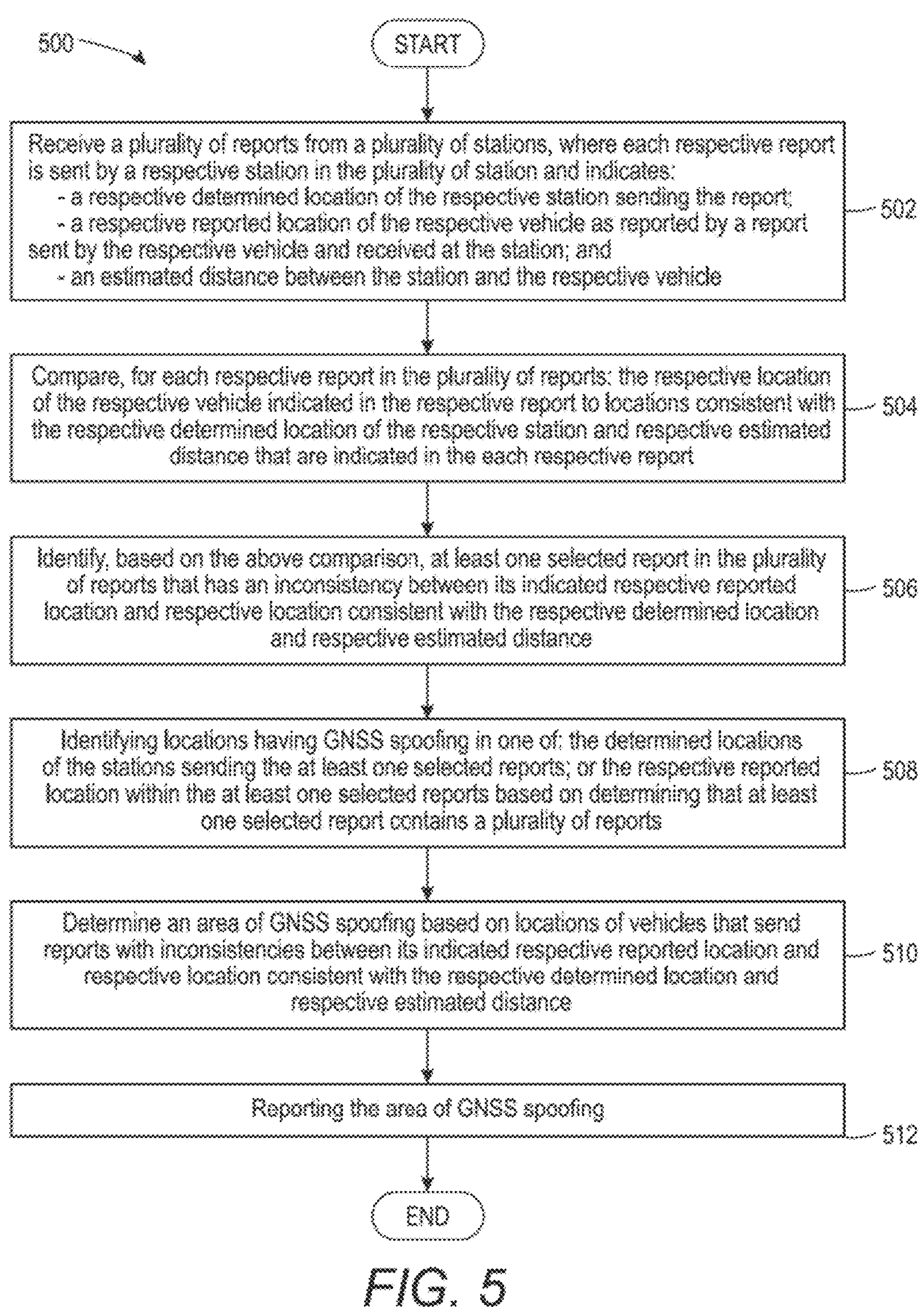
FIG. 5 illustrates a location inconsistency processing, according to an example.

FIG. 5 illustrates a location inconsistency processing 500, according to an example. The location inconsistency processing 500 in an example is performed by systems within or associated with the above-described central control and processing system 154. As discussed above, processing performed by systems within or associated with the central control and processing system 154 is able to be performed by processing systems having any suitable architecture, such as a computer located at the central control and processing system, one or more computers located at other locations, cloud-based processing, other architectures, or combinations of these. In some examples, parts of the location inconsistency processing 500 is able to be performed by processors on the ocean drifters 170.

The location inconsistency processing 500 receives, at 502, a plurality of reports from a plurality of stations. In an example, each respective report is sent by a respective station in the plurality of station and indicates:

a respective determined location of the respective station sending the report;

an estimated distance between the station and a respective vehicle; and a respective reported location of the respective vehicle as reported by a report sent by the respective vehicle and received at the station A comparison is then performed, at 504, for each respective report, comparing: A) the respective location of the respective vehicle indicated in the respective report, to B) locations consistent with the respective determined location of the respective station and respective estimated distance that are indicated in each respective report. These comparisons, in an example, will identify situations where the location reported by a particular station and the location reported by the respective vehicle do not correlate with estimated distances between the station(s) and the respective vehicle. In an example, the comparison determines whether the respective location of the respective vehicle is within a threshold distance of a circumference of a circle around the respective location of the respective station that has a radius of the respective estimated distance.

At least one selected report in the plurality of reports is identified based on the above comparison, at 506, that has an inconsistency between its indicated respective reported location and respective location consistent with the respective determined location and respective estimated distance. Such an inconsistency could be caused by the respective location of the respective vehicle being farther than the threshold distance from a circumference of the circle around the respective location of the respective station that has a radius of the respective estimated distance. Such an inconsistency is able to be caused by, for example, spoofing of the GNSS receiver on one, or both, of the station or vehicle.

Based on determining that the at least one selected report contains a plurality of reports, identifying, at 508, locations having GNSS spoofing in one of: the determined locations of the stations sending the at least one selected reports; or a likely location of a vehicle reporting the at least one selected reports. In an example, identifying locations having GNSS spoofing is able to be based on some reports having reported locations for a particular vehicle that are consistent with the determined location and estimated distance, while other reports that have reported distances for the same particular vehicle that are inconsistent with the determined location and estimated distances in those other reports. In an example, a likely location of a vehicle is able to be determined based on determined locations of a number of stations that receive a reporting signal from that vehicle in combination with estimated distances between those stations and the vehicle.

An area of GNSS spoofing is determined, at 510, based on the respective reported locations of vehicles that send reports with inconsistencies between its indicated respective reported location and respective location consistent with the respective determined location and respective estimated distance.

The area of GNSS spoofing is reported, at 512. In an example, one or more areas of GNSS spoofing are reported in a spoofed location report. The location inconsistency processing 500 then ends.

Figure 6:
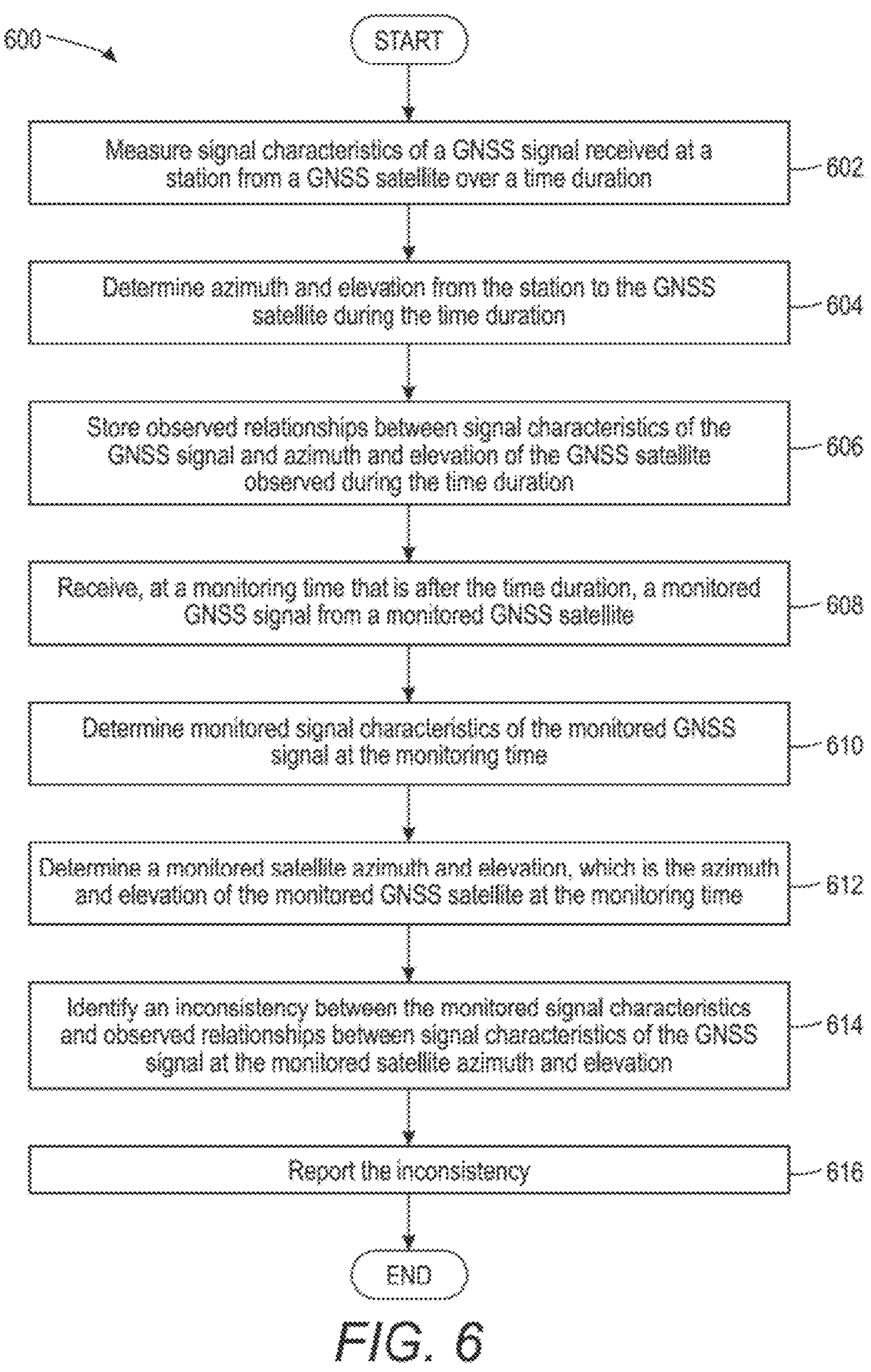
FIG. 6 illustrates a GNSS signal monitoring process, according to an example.

FIG. 6 illustrates a GNSS signal monitoring process 600, according to an example. The GNSS signal monitoring process 600 is an example of processing performed by the above-described processor 210 in the ocean drifter block diagram 200 based on data measured by a GNSS receiver 202 to identify abnormalities in received GNSS signals. In further examples, some of the below described GNSS signal monitoring process 600 is able to be performed by processors at other locations, such as the processor 302 described above with regards to the central control and processing system block diagram 300 at the central control and processing system 154.

The GNSS signal monitoring process 600 measures, at 602, signal characteristics of a GNSS signal received at a station from a GNSS satellite over a time duration. In an example, measured signal characteristics are able to include quantities that indicate the relative received signal strength of the signal, such as an indication of signal-to-noise ratio of the received GNSS signal. In general, GNSS signal receivers, such as a GPS receiver that is a GNSS receiver 202 in an example, measure quantities related to received signal strength such as quantities proportional to received signal-to-noise ratios. A GPS receiver in an example provides these measurements to the processor 210 for further processing as set forth below.

In an example, measured GNSS signal characteristics are able to include measurements or characterizations of radio frequency energy that is received within one or more GNSS RF bandwidths. For example, a general RF receiver, such as a Software Defined Radio (SDR), specialized receiver, other receiver, or combinations of these, are able to operate to receive radio frequency energy within a GNSS radio frequency band. The received radio frequency energy is then characterized. Such characterizations are able to include, for example, measurement of received signal strength in a particular RF bandwidth, observed modulation of received radio frequency energy (such as pulses, ramps, other waveforms in the amplitude domain, frequency domain, or both), other characterizations, or combinations of these. Based on those characterizations, a determination can be made that the radio frequency energy received in the GNSS radio frequency band comprises interference signals.

The values of azimuth and elevation from the station to the GNSS satellite during the time duration that the signal characteristics of the GNSS signal is measured is determined, at 604. The azimuth and elevation from a particular location, such as the present station location, to a particular GNSS satellite is able to be determined by various techniques. In an example, the GNSS receiver, such as a GPS receiver, can produce the present azimuth and elevation angle to each GNSS satellite in view at a given time and provide that data as an output. In further examples, azimuth and elevation angles to various GNSS satellites from a given geographic location are able to be determined by known techniques.

Observed relationships between signal characteristics of the GNSS signal and azimuth and elevation of the GNSS satellite observed during the time duration are stored, at 606. In general, the measured signal characteristics, such as signal-to-noise ratio, will vary in a repeatable pattern as a function of azimuth and elevation to the satellite. This stored relationship is a baseline in an example to which future observed signal characteristics are compared to determine whether the received GNSS signal deteriorates or otherwise changes over time.

A monitored GNSS signal from a monitored GNSS satellite is received, at 608, at a monitoring time that is after, i.e., subsequent to, the time duration. In general, the monitored GNSS signal is able to be transmitted by a satellite whose signal characteristics were measured above, or from another GNSS satellite.

In an example, the monitored GNSS signal is received to support determining, at 610, monitored signal characteristics of the monitored GNSS signal at the monitoring time. Such monitored signal characteristics include, for example, received signal strength indicators such as a signal-to-noise ratio of the monitored GNSS signal at the monitoring time.

A monitored satellite azimuth and elevation is determined, at 612, which is the azimuth and elevation of the monitored GNSS satellite at the monitoring time. In an example, the monitored satellite azimuth and elevation are determined in a manner similar to that described above with regards to determining the azimuth and elevation from the station to the GNSS satellite during the time duration that the signal characteristics of the GNSS signal is measured.

An inconsistency between the monitored signal characteristics and observed relationships between signal characteristics of the GNSS signal at the monitored satellite azimuth and elevation is identified, at 614. In an example, the signal characteristic, such as a quantity indicating a signal-to-noise ratio of the received GNSS signal, is compared to stored values of that quantity that were measured for other GNSS satellites at the same azimuth and elevation relative to the receiving station. In general, it is assumed that signal strengths of GNSS signals transmitted from GNSS satellites have repeatable patterns as a function of azimuth and elevation of the GNSS satellite from the receiving station. Therefore, in an example, deviations of the monitored signal characteristics from the stored values will indicate an inconsistency. In some examples, an inconsistency is declared when the monitored signal-to-noise ratio, or any other signal characteristic, differs from stored values for that characteristic by a threshold. Such a determined inconsistency is able to be caused by, for example, signal interference being generated in the vicinity of the station receiving the signal.

Any determined inconsistencies are reported, at 616. In an example, these inconsistencies are reported to a central server that accumulates such reports and processes the locations of stations that are reporting such inconsistencies to determine areas that may be subject to interference of the GNSS signal. In the example of the above-described operational environment for a satellite radio navigation operations monitoring system 100, the inconsistency is reported to the central control and processing system 154 via the data communications satellite 150. The GNSS signal monitoring process 600 then ends.

Figure 7:
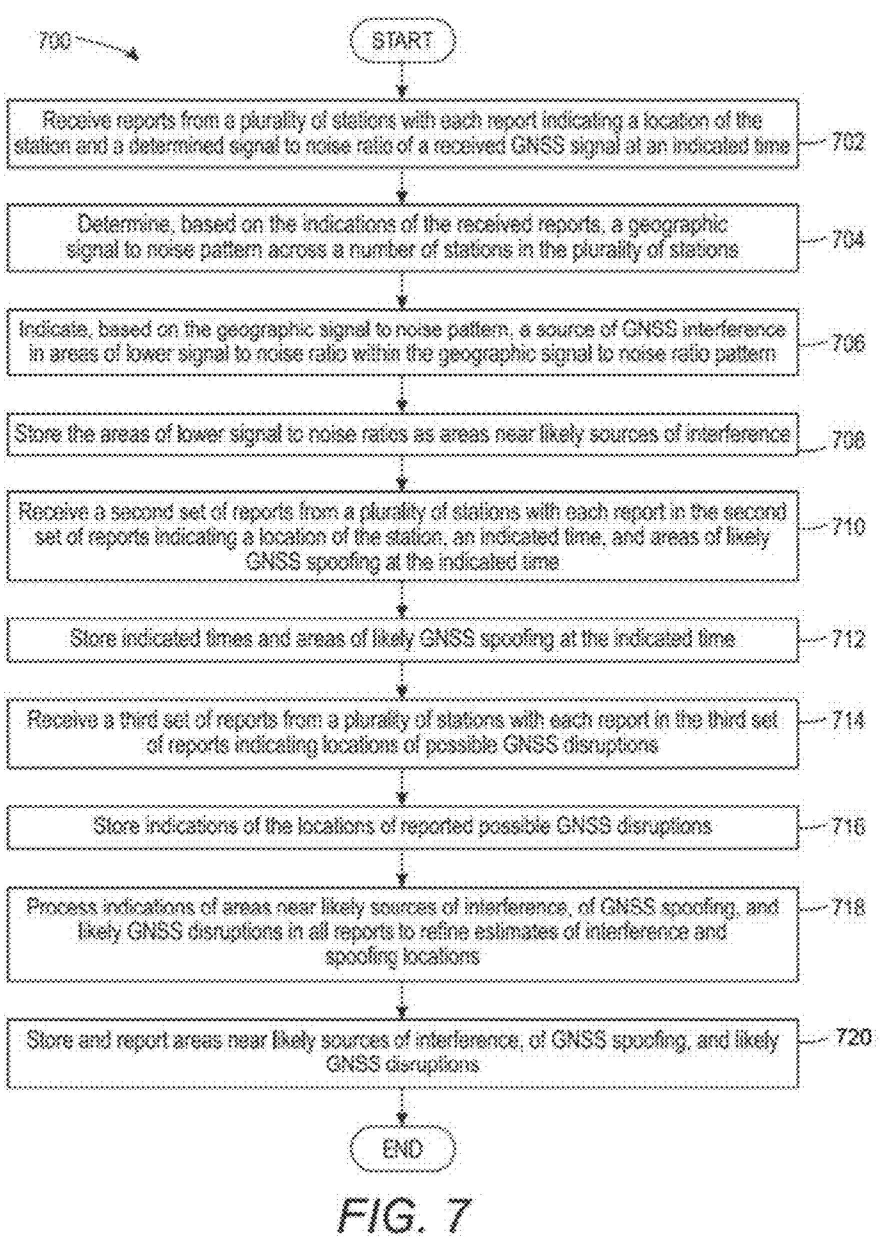
FIG. 7 illustrates a GNSS central monitoring system process, according to an example.

FIG. 7 illustrates a GNSS central monitoring system process 700, according to an example. The GNSS central monitoring system process 700 is an example of a process performed by the central control and processing system 154 to identify areas of GNSS disturbances. In an example, the GNSS central monitoring system process 700 receives and assembles data collected and produced by ocean drifters 170 in order to perform data analysis on all of the assembled data from multiple ocean drifters 170 and produce refined results concerning observations of GNSS operations.

The GNSS central monitoring system process 700 receives, at 702, reports from a plurality of stations with each report indicating a location of the station and a determined signal-to-noise ratio of a received GNSS signal at an indicated time. In an example, the central control and processing system 154 is able to receive reports that are sent by a number of ocean drifters 170 where each report indicates the location of the ocean drifter and signal-to-noise ratios of GNSS signals received at that location at the indicated time by that ocean drifter.

The GNSS central monitoring system process 700 determines, at 704 based on the indications of the received reports, a geographic signal-to-noise pattern across a number of stations in the plurality of stations. In an example, a geographic map is maintained that indicates measured signal-to-noise ratios for GNSS signals at the various locations of each of the ocean drifters over time.

The GNSS central monitoring system process 700 indicates, at 706 based on the geographic signal-to-noise pattern, a source of GNSS interference in areas of lower signal-to-noise ratio within the geographic signal-to-noise ratio pattern. In general, each GNSS signal will exhibit a signal-to-noise time variation that is related to the elevation of the particular GNSS satellite transmitting that signal. The time variations of these signal-to-noise ratios are generally repeatable for GNSS satellites that have the same azimuth and elevation from a receiving station. Variations in the signal-to-noise ratio time variation as a function of azimuth and elevation, such as a reduction in peak signal-to-noise ratio when a GNSS satellite reaches it maximum elevation, is noted as a result of possible interference. In general, GNSS interference may be reported if signal-to-noise ratios are either higher or lower than have been previously observed. In an example, a broadband interference signal is likely to lower the signal-to-noise ratio of the received GNSS signal. In another example, an interference source that is generating simulated GNSS signals, such as may be used for spoofing, would likely cause the signal-to-noise ratio of the GNSS signal to be higher than had been previously observed since that simulated GNSS signal would have to “overpower” the real GNSS signal to effectively alter location processing in the GNSS receiver.

The GNSS central monitoring system process 700 stores, at 708, the areas of lower signal-to-noise ratios as areas near likely sources of interference. In an example, the processor 302 of the central control and processing system block diagram 300 stores indications of such areas in the areas of likely interference 328 in the data storage 310.

The GNSS central monitoring system process 700 receives, at 710, a second set of reports from a plurality of stations with each report indicating a location of the station, an indicated time, and an area of GNSS spoofing at the indicated time. In an example, the second set of reports is able to include spoofed location reports that include indications of areas of GNSS spoofing. In an example, the central control and processing system 154 is able to receive reports that are sent by a number of ocean drifters 170 where each report indicates possible locations of GNSS spoofing. The creation of such reports is described above with regards to the location inconsistency processing 500.

The received indications of areas of likely GNSS spoofing are stored, at 712. In an example, these indications are stored in the areas of likely spoofing 326.

The GNSS central monitoring system process 700 receives, at 714, a third set of reports from a plurality of stations with each report in the third set of reports indicating locations of possible GNSS disruptions. These reports in an example, are sent from a number of ocean drifters 170 to the central control and processing system 154 in a manner similar to that described above. The creation of such reports is described above with regards to the station processing flow 400. The received indications of areas of possible GNSS disruptions are stored, at 716. In an example, these indications are stored in the location inconsistency reports 324.

The GNSS central monitoring system process 700 processes, at 718, indications of areas near likely sources of interference, of GNSS spoofing, and likely GNSS disruptions in all reports to refine estimates of interference and spoofing locations. Such processing in various examples is able to include correlations of locations of disruptions, spoofing, interference, a vehicle that is reporting locations inconsistent with locations determined by ocean drifter location and estimated distances to the vehicle, other processing, or combinations of these.

The GNSS central monitoring system process 700 stores and reports, at 720, areas near likely sources of interference, of GNSS spoofing, and likely GNSS disruptions. In an example, this data is stored in the refined areas of interferences, GNSS spoofing, and GNSS disruptions 330. In an example, the reporting includes sending interference reports that indicate areas of likely GNSS interference. The GNSS central monitoring system process 700 then ends.

Figure 8:
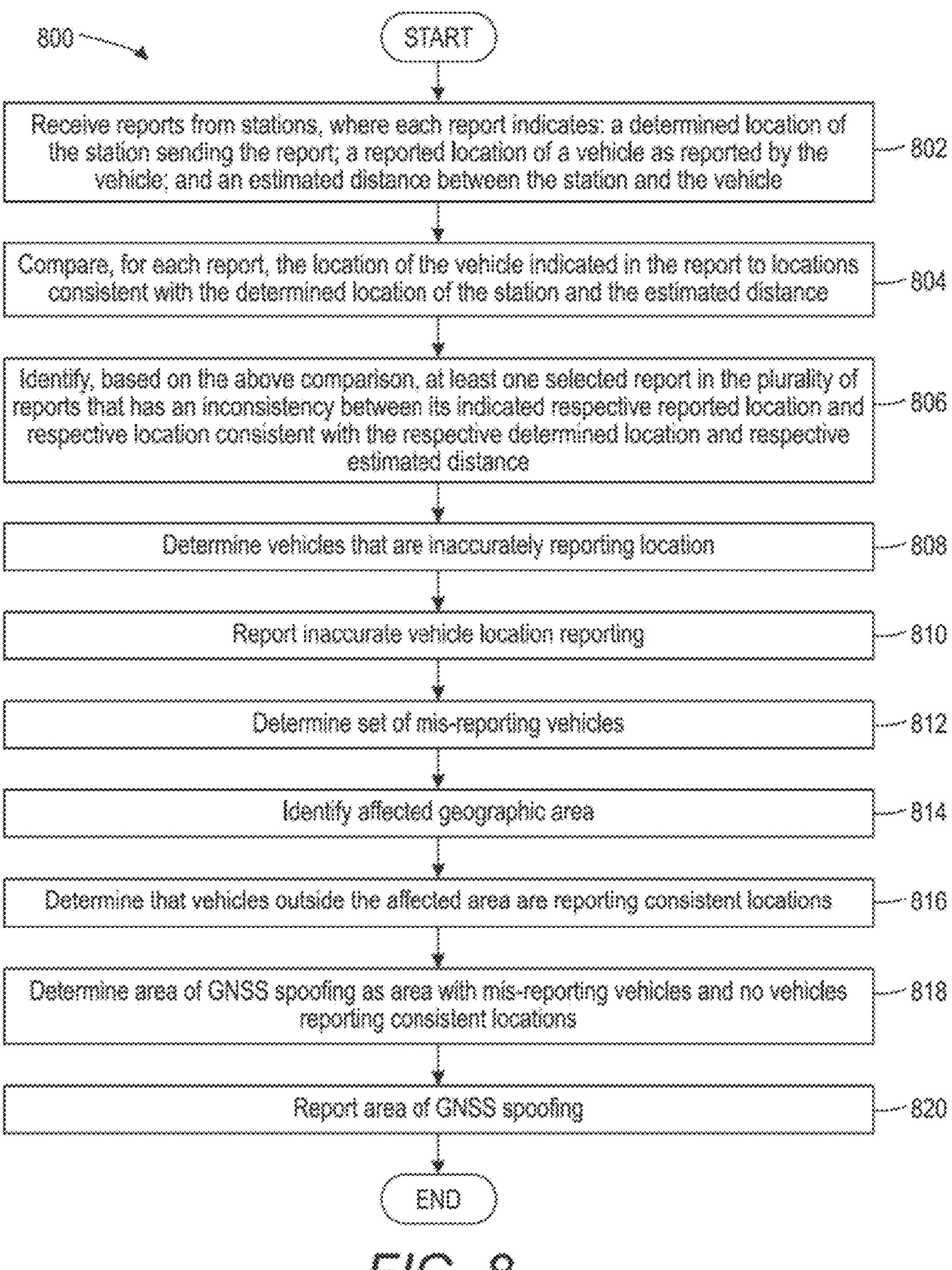
FIG. 8 illustrates a illustrates a GNSS spoofing classification process, according to an example.

FIG. 8 illustrates a GNSS spoofing classification process 800, according to an example. The GNSS spoofing classification process 800 in an example is performed by systems within or associated with the above-described central control and processing system 154. As discussed above, processing performed by systems within or associated with the central control and processing system 154 is able to be performed by processing systems having any suitable architecture, such as a computer located at the central control and processing system, one or more computers located at other locations, cloud-based processing, other architectures, or combinations of these. In some examples, parts of the GNSS spoofing classification process 800 is able to be performed by processors on the ocean drifters 170.

The GNSS spoofing classification process 800 receives, at 802, a plurality of reports from a plurality of stations, where each report in the plurality of reports contains a respective reported location from a respective vehicle within a plurality of vehicles. In an example, each respective report is sent by a respective station in the plurality of station and indicates:

- a respective determined location of the respective station sending the report;
- an estimated distance between the station and a respective vehicle; and
- a respective reported location of the respective vehicle as reported by a report sent by the respective vehicle and received at the station A comparison is then performed, at 804, for each respective report, comparing: A) the respective location of the respective vehicle indicated in the respective report, to B) locations consistent with the respective determined location of the respective station and respective estimated distance that are indicated in each respective report. These comparisons, in an example, will identify situations where the location reported by a particular station and the location reported by the respective vehicle do not correlate with estimated distances between the station(s) and the respective vehicle. In an example, the comparison determines whether the respective location of the respective vehicle is within a threshold distance of a circumference of a circle around the respective location of the respective station that has a radius of the respective estimated distance.

At least one selected report in the plurality of reports is identified based on the above comparison, at 806, that has an inconsistency between its respective indicated reported location and respective location consistent with the respective determined location and respective estimated distance. Such an inconsistency would be caused by the respective location of the respective vehicle being farther than the threshold distance from a circumference of the circle around the respective location of the respective station that has a radius of the respective estimated distance. Such an inconsistency is able to be caused by, for example, spoofing of the GNSS receiver on one, or both, of the station or vehicle.

In an example, the stations within the plurality of stations are distributed over a geographic area in order to more effectively identify areas of GNSS interference, spoofing, or both. In one such example, a likelihood that the respective reported location differs from an actual location of the vehicle is determined based on the plurality of stations being distributed over a geographic area and based on inconsistencies between respective indications of respective reported locations of the vehicle and respective indications of respective received signal strengths within the plurality of reports. This inconsistency in an example is caused by the vehicle sending an inaccurate reported location in the report. The inaccurate location is able to have been sent as an intentional spoofing measure or due to equipment problems on the vehicle.

Vehicles inaccurately reporting their locations are determined, at 808. In an example, a vehicle that is inaccurately reporting its locations is determined by observing that the vehicle reports locations that differ by a similar distance from locations that are consistent with the determined locations and estimated distances for each of a number of stations that receive the reported location.

The inaccurate vehicle location reporting is reported, at 810. This reporting in an example includes identification of the inaccurately reporting vehicle, as is indicated in reporting messages sent by that vehicle such as AIS messages. In further examples, an estimated location of the vehicle is able to also be included in the report based upon the determined locations of the stations receiving messages from the vehicle and the estimated distances between those stations and the vehicle.

A set of mis-reporting vehicles is determined, at 812 by identifying a subset of vehicles within the plurality of vehicles that each report respective indications of respective reported locations of the respective vehicle that are inconsistent with respective indications of respective received signal strengths within the plurality of reports in combination with the respective determined location.

An affected geographic area is identified, at 814. In an example, the affected geographic area is a geographic area that is determined to have the set of mis-reporting vehicles located therein.

A determination is made, at 816, that vehicles in the plurality of vehicle that are outside of the affected geographic area report respective indications of respective reported locations of the respective vehicle that are consistent with respective indications of respective received signal strengths within the plurality of reports in combination with the respective determined location.

The affected geographic area is determined, at 818 as an area of GNSS spoofing based on determining that the mis-reporting vehicles are within an affected geographic area, and that that vehicles in the plurality of vehicle that are outside of the affected geographic area report respective indications of respective reported locations of the vehicle that are consistent with respective indications of respective received signal strengths within the plurality of reports in combination with the respective determined location.

The area of GNSS spoofing is reported, at 820. The GNSS spoofing classification process 800 then ends.

Figure 9:
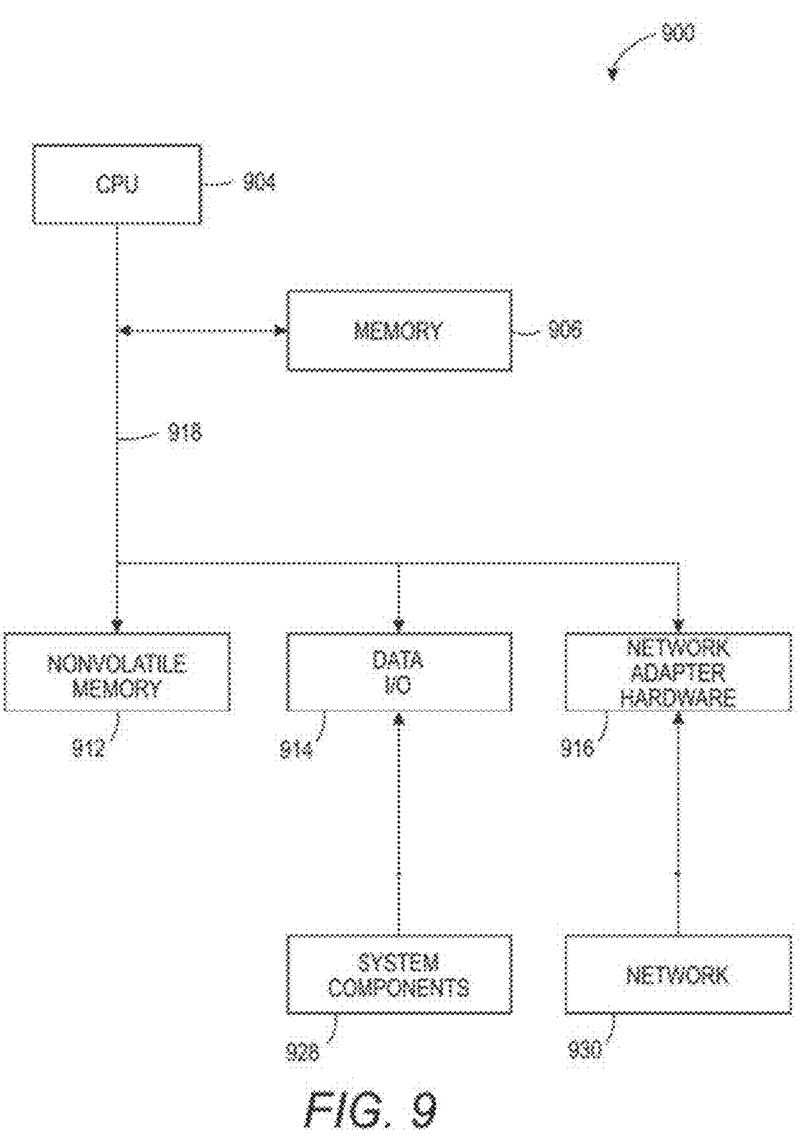
FIG. 9 illustrates a block diagram illustrating a processor, according to an example.

FIG. 9 illustrates a block diagram illustrating a processor 900 according to an example. The processor 900 is an example of a processing subsystem that is able to perform any of the above-described processing operations, control operations, other operations, or combinations of these.

The processor 900 in this example includes a CPU 904 that is communicatively connected to a main memory 906 (e.g., volatile memory), a non-volatile memory 912 to support processing operations. The CPU is further communicatively coupled to a network adapter hardware 916 to support input and output communications with external computing systems such as through the illustrated network 930.

The processor 900 further includes a data input/output (I/O) processor 914 that is able to be adapted to communicate with any type of equipment, such as the illustrated system components 928. The data input/output (I/O) processor in various examples is able to be configured to support any type of data communications connections including present day analog and/or digital techniques or via a future communications mechanism. A system bus 918 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above-described methods and realize the above described systems.

What is claimed is:

1. A method for monitoring GNSS based navigation operations, the method comprising:

receiving a plurality of reports comprising at least one respective report from each respective station in a plurality of stations, each respective report comprising:

a respective indication of a respective determined location, as determined by a respective GNSS receiver, of the respective station at a respective time;

a respective indication of a respective reported location of a vehicle, where the respective reported location is determined by a GNSS receiver and is communicated in a respective location reporting signal transmitted by the vehicle; and a respective indication of a respective received signal strength, at the respective station, of the respective location reporting signal, wherein the respective indication of a respective signal strength comprises a respective estimated distance between the respective station and the vehicle that is determined based on a respective received signal strength of the respective location reporting signal at the respective station;

determining, for each respective report, a respective calculated distance between the respective station and the vehicle based on a difference between the respective determined location and the respective reported location;

determining, based on inconsistencies between respective indications of respective reported locations of the vehicle and respective indications of respective received signal strengths within the plurality of reports comprising the respective calculated distance differing from the respective estimated distance by more than a threshold, a likelihood of GNSS based navigation abnormality in a vicinity of at least one of the stations in the plurality of stations or the vehicle; and reporting, based on determining the likelihood of GNSS based navigation abnormality, a geographic location of the likelihood of GNSS based navigation abnormality.

2. The method of claim 1, wherein the plurality of stations comprises a plurality of floating stations each configured to at least:

determine the respective determined location of the respective station;

determine the respective received signal strength;

determine the respective calculated distance; and send a report within the plurality of reports, wherein the report comprises the respective determined location, the respective calculated distance and the respective reported location.

3. The method of claim 1, further comprising;

determining, for at least one respective station in the plurality of stations, a time sequence of signal-to-noise ratios of GNSS signals over a first time duration as a function of at least one of azimuth or elevation of a GNSS satellite relative to the respective station;

determining, for the at least one respective station at a monitoring time subsequent to the first time duration, respective monitored azimuth and elevation values to at least one GNSS satellite from the respective station;

measuring a respective measured signal-to-noise ratio for a GNSS signal received at the respective station from the at least one GNSS satellite at the monitoring time;

determining that the respective measured signal-to-noise ratio differs from signal-to-noise ratios in the vicinity of the time sequence of signal-to-noise ratios of GNSS satellites that are at the respective monitored azimuth and elevation; and sending an interference report indicating that the respective measured signal-to-noise ratio differs from signal-to-noise ratios in the vicinity of the time sequence of signal-to-noise ratios of GNSS satellites that are at the respective monitored azimuth and elevation.

4. The method of claim 3, wherein the at least one respective report further comprises a respective indication of a respective signal-to-noise ratio of a GNSS signal received by the GNSS receiver at the monitoring time, and wherein the determining that the respective measured signal-to-noise ratio differs from signal-to-noise ratios in the vicinity of the time sequence of signal-to-noise ratios of GNSS satellites that are at the respective monitored azimuth and elevation is performed at the respective station, and wherein sending the interference report comprises sending the interference report from the respective station.

5. The method of claim 1, comprising:

comparing, for each respective report, the respective reported location of the respective vehicle indicated in the respective report to locations that are consistent with the respective determined location of the respective station and the respective estimated distance that are indicated in each respective report;

identifying, based on the comparing, at least one selected report in the plurality of reports that has a distance between its indicated respective reported location and respective determined location that is consistent with the respective determined location and the respective estimated distance;

based on identifying the at least one selected report, identifying spoofed location reports in the plurality of reports where the spoofed location reports are reports other than the selected report that are reports that indicate GNSS spoofing in a respective area that is one of the respective determined location and a likely location of the vehicle corresponding to the spoofed location reports;

determining an area of GNSS spoofing based on overlaps of respective areas indicated in the spoofed location reports; and sending a report indicating the area of GNSS spoofing.

6. The method of claim 1, further comprising:

receiving radio frequency energy within a GNSS radio frequency band with a general radio receiver;

characterizing the radio frequency energy; and determining, based on characterizing the radio frequency energy, that the radio frequency energy received in the GNSS radio frequency band comprises interference signals.

7. The method of claim 1, wherein the plurality of stations are distributed over a geographic area, wherein the method further comprises determining, based on the plurality of stations being distributed over a geographic area and based on inconsistencies between respective indications of respective reported locations of the vehicle and respective indications of respective received signal strengths within the plurality of reports, a likelihood that the respective reported location differs from an actual location of the vehicle, wherein the reporting comprises reporting the likelihood that the respective reported location differs from an actual location of the vehicle.

8. The method of claim 1, further comprising receiving a second plurality of reports, where each report in the second plurality of reports comprises:

a respective indication of a respective determined location, as determined by a respective GNSS receiver, of the respective station at a respective time;

a respective indication of a respective reported location of a respective vehicle within a plurality of vehicles, where the respective reported location is determined by a GNSS receiver and is communicated in a respective location reporting signal transmitted by the respective vehicle; and a respective indication of a respective received signal strength, at the respective station, of the respective location reporting signal;

determining that a subset of vehicles within the plurality of vehicles report respective indications of respective reported locations of the vehicle that are inconsistent with respective indications of respective received signal strengths within the plurality of reports in combination with the respective determined location;

determining that each vehicle in the subset of vehicles is within an affected geographic area;

determining, that vehicles in the plurality of vehicle that are outside of the affected geographic area report respective indications of respective reported locations of the vehicle that are consistent with respective indications of respective received signal strengths within the plurality of reports in combination with the respective determined location; and determining that the affected geographic area is an area of GNSS spoofing based on determining that a subset of vehicles within the plurality of vehicles report respective indications of respective reported locations of the vehicle that are inconsistent with respective indications of respective received signal strengths within the plurality of reports in combination with the respective determined location, that the subset of vehicles are within an affected geographic area, and that that vehicles in the plurality of vehicle that are outside of the affected geographic area report respective indications of respective reported locations of the vehicle that are consistent with respective indications of respective received signal strengths within the plurality of reports in combination with the respective determined location, wherein the reporting comprises reporting, based on determining that the affected geographic area is an area of GNSS spoofing, the affected geographic area is an area of likely GNSS spoofing.

9. A GNSS based navigation operations monitoring system, comprising:

a processor;

a memory, communicatively coupled to the processor; and a report receiver, communicatively coupled to the processor and the memory, the report receiver configured to, when operating, receive a plurality of reports comprising at least one respective report from each respective station in a plurality of stations, each respective report comprising:

a respective indication of a respective determined location, as determined by a GNSS receiver, of the respective station at a respective time;

a respective indication of a respective reported location of a vehicle, where the respective reported location is determined by a GNSS receiver and is communicated in a respective location reporting signal transmitted by the vehicle; and a respective indication of a respective received signal strength, at the respective station, of the respective location reporting signal, wherein the respective indication of a respective signal strength comprises a respective estimated distance between the respective station and the vehicle that is determined based on a respective received signal strength of the respective location reporting signal at the respective station, wherein the processor, when operating, is configured to:

determine, for each respective report, a respective calculated distance between the respective station and the vehicle based on a difference between the respective determined location and the respective reported location;

determine, based on inconsistencies between respective indications of respective reported locations of the vehicle and respective indications of respective received signal strengths within the plurality of reports comprising the respective calculated distance differing from the respective estimated distance by more than a threshold, a likelihood of GNSS based navigation abnormality in a vicinity of at least one of the stations in the plurality of stations or the vehicle; and report, based on determining the likelihood of GNSS based navigation abnormality, a geographic location of the likelihood of the GNSS based navigation abnormality.

10. The GNSS based navigation operations monitoring system of claim 9, further comprising the plurality of stations, wherein the plurality of stations comprises a plurality of floating stations each configured to at least:

determine the respective determined location of the respective station;

determine the respective received signal strength;

determine the respective calculated distance; and send a report within the plurality of reports, wherein the report comprises the respective determined location, the respective calculated distance and the respective reported location.

11. The GNSS based navigation operations monitoring system of claim 9, wherein the processor, when operating, is further configured to;

determine, for at least one respective station in the plurality of stations, a time sequence of signal-to-noise ratios of GNSS signals over a first time duration as a function of at least one of azimuth or elevation of a GNSS satellite relative to the respective station;

determine, for the at least one respective station at a monitoring time subsequent to the first time duration, respective monitored azimuth and elevation values to at least one GNSS satellite from the respective station;

measure a respective measured signal-to-noise ratio for a GNSS signal received at the respective station from the at least one GNSS satellite at the monitoring time;

determine that the respective measured signal-to-noise ratio differs from signal-to-noise ratios in the vicinity of the time sequence of signal-to-noise ratios of GNSS satellites that are at the respective monitored azimuth and elevation; and send an interference report indicating that the respective measured signal-to-noise ratio differs from signal-to-noise ratios in the vicinity of the time sequence of signal-to-noise ratios of GNSS satellites that are at the respective monitored azimuth and elevation.

12. The GNSS based navigation operations monitoring system of claim 9, wherein the GNSS based navigation operations monitoring system further comprises the plurality of stations, wherein the plurality of stations comprises a plurality of floating stations comprising at least a part of the processor, and wherein the processor of the floating stations is configured to, when operating, perform the:

compare, for each respective report, the respective reported location of the respective vehicle indicated in the respective report to locations that are consistent with the respective determined location of the respective station and the respective estimated distance that are indicated in each respective report;

identify, based on a comparison of the respective reported location of the respective vehicle indicated in the respective report to locations that are consistent with the respective determined location of the respective station and the respective estimated distance that are indicated in each respective report, at least one selected report in the plurality of reports that has a distance between its indicated respective reported location and respective determined location that is consistent with the respective determined location and the respective estimated distance;

identify, based on identifying the at least one selected report, spoofed location reports in the plurality of reports, the spoofed location reports being reports other than the selected report and are reports that indicate GNSS spoofing in a respective area that is one of the respective determined location and a likely location of the vehicle corresponding to the spoofed location reports;

determine an area of GNSS spoofing based on overlaps of respective areas indicated in the spoofed location reports; and send a report indicating the area of GNSS spoofing.

13. The GNSS based navigation operations monitoring system of claim 9, further comprising a GNSS based navigation operations monitoring station, the GNSS based navigation operations monitoring station comprising:

a second processor;

a second memory, communicatively coupled to the second processor, wherein the GNSS receiver is communicatively coupled to the second processor and to the second memory, wherein the GNSS receiver, when operating, is configured to:

receive GNSS signals from one or more GNSS constellations; and process the GNSS signals to determine a second determined location of the GNSS based navigation operations monitoring station; and the GNSS based navigation operations monitoring station further comprising:

a location reporting signal receiver, communicatively coupled to the second processor and the second memory, wherein the location reporting signal receiver, when operating, is configured to:

receive a second location reporting signal transmitted by a second vehicle, the second location reporting signal comprising an indication of a reported location of the second vehicle; and determine a signal strength of the second location reporting signal, and wherein the second processor, when operating, is configured to:

determine a calculated distance between the second determined location and a location of the reported location of the second vehicle; and determine, based on inconsistencies between the indication of reported location of the second vehicle and the signal strength of the second location reporting signal, a second likelihood of GNSS based navigation abnormality in a vicinity of at least one of the GNSS based navigation operations monitoring station or the second vehicle; and send an anomaly report comprising an indication of the second likelihood of GNSS based navigation abnormality in a vicinity of at least one of the GNSS based navigation operations monitoring station or the second vehicle.

14. The GNSS based navigation operations monitoring station of claim 13, wherein the second processor, when operating, is further configured to determine, based on the signal strength of the second location reporting signal, an estimated distance between the GNSS based navigation operations monitoring station and the second vehicle, and wherein the second likelihood of GNSS based navigation abnormality is based on an inconsistency between the calculated distance and the estimated distance.

15. The GNSS based navigation operations monitoring station of claim 13, wherein the second processor, when operating, is further configured to:

determine a time sequence of signal-to-noise ratios of GNSS signals over a first time duration as a function of at least one of azimuth or elevation of a GNSS satellite relative to the GNSS based navigation operations monitoring station;

determine, at a monitoring time subsequent to the first time duration, respective monitored azimuth and elevation values to at least one GNSS satellite from the GNSS based navigation operations monitoring station;

measure a respective measured signal-to-noise ratio for a GNSS signal received at the GNSS based navigation operations monitoring station from the at least one GNSS satellite at the monitoring time;

determine that the respective measured signal-to-noise ratio differs from signal-to-noise ratios in the vicinity of the time sequence of signal-to-noise ratios of GNSS satellites that are at the respective monitored azimuth and elevation; and send an interference report indicating that the respective measured signal-to-noise ratio differs from signal-to-noise ratios in the vicinity of the time sequence of signal-to-noise ratios of GNSS satellites that are at the respective monitored azimuth and elevation.

16. The GNSS based navigation operations monitoring station of claim 13, wherein the anomaly report further comprises the second determined location, the calculated distance, the reported location of the second vehicle.

* * * * *